United States Patent Office 3,156,693
Patented Nov. 10, 1964

3,156,693
PROCESS FOR PREPARING S-OXIDES OF 2-LOWER ALKYL ISOTHIONICOTINAMIDES
Paul Gailliot, Paris, Jean Baget, Sceaux, Seine, and Pierre Sarret, Fontenay-sous-Bois, Seine, France, assignors to Rhone-Poulenc S.A., Paris, France, a French body corporate
No Drawing. Filed Apr. 23, 1962, Ser. No. 189,262
Claims priority, application France June 1, 1961
3 Claims. (Cl. 260—294.8)

This invention relates to a new process for the preparation of isothionicotinamide derivatives.

The preparation of S-oxides of thioamides has hitherto been achieved by oxidation of the thioamides by means of hydrogen peroxide (cf. in particular, Kitamura [J. Pharm. Soc. Japan 58, 246, 809 (1938)] and Walter and Curts [Berichte 93, 1511 (1960)]).

It has now unexpectedly been found that isothionicotinamide compounds can be converted into their S-oxides by oxidation using an inorganic per-salt, and purer products obtained in comparison with those resulting from the oxidation of isothionicotinamides using hydrogen peroxide.

According to the present invention, a process for the preparation of S-oxides of isothionicotinamide and its derivatives comprises oxidising isothionicotinamide or a derivative thereof with an inorganic per-salt at a temperature between 10° and 40° C. in an inert organic or aqueous organic medium, for example in pyridine-ethanol or ethanol-water mixtures. Preferably the inorganic per-salt employed is an alkali metal perborate or percarbonate.

The aforesaid process is, in particular, applicable to the preparation of the S-oxides of isothionicotinamides of the general formula:

(I)

wherein R represents a hydrogen atom or an alkyl group containing a maximum of five carbon atoms.

The S-oxide derivatives of isothionicotinamides prepared by the process of the present invention exhibit a tuberculostatic activity when tested in vitro on the tuberculosis strains $H_{37}Rv$, Br, Erm and Vy, in in vivo in the mouse on the tuberculosis strain Br. They have a low toxicity and good gastric tolerance. Their tuberculostatic activity, low toxicity and gastric tolerance accordingly render the S-oxide derivatives of isothioniotinamides useful in the treatment of human tuberculosis. For use in the treatment of tuberculosis they may be associated with a pharmaceutical carrier, and the compositions made in manner known per se into solid forms suitable for oral administration, such as granules or tablets, or into suppositories. In human therapy, such compositions should generally be administered so as to give to an adult 0.25 to 1 g. of active substance (preferably in several small amounts) per day.

The following examples illustrate the invention.

Example I

A mixture of 12 N hydrochloric acid (12.5 cc.) and ethanol (50 cc.) is added, with stirring over 30 minutes at a temperature kept at 25° C., to a suspension comprising isothionicotinamide (13.8 g.), sodium perborate (23 g.), ethanol (150 cc.) and water (15 cc.). After completion of the addition, stirring is continued for 4 hours during which time the temperature falls to that of the laboratory. A first crop of golden-yellow crystals is separated and washed with distilled water (100 cc.) to remove inorganic salts. By concentration to a small volume (5 to 7 cc.) in vacuo, a second crop is obtained. The mixture of crystals of the first and second crop is then triturated with a saturated aqueous sodium bicarbonate solution (100 cc.). Insoluble material is separated, washed with water and dried, giving yellow crystals of isothionicotinamide-S-oxide (7 g.), M.P. 228–230° C.

Example II

12 N hydrochloric acid (23.4 cc.) is added over 40 minutes, without the temperature rising above 35° C., to a suspension comprising 2-ethyl-isothionicotinamide (33.2 g.), sodium perborate (46 g.), pyridine (100 cc.) and ethanol (150 cc.) which has been heated to 30° C. When the addition is complete, stirring is continued for 1 hour during which time the temperature is allowed to fall to that of the laboratory. Powdered potassium carbonate (20.6 g.) is then added in small portions with stirring which is continued for 12 hours. The precipitated inorganic salts are filtered off and washed with ethanol (80 cc.) and the combined filtrate and washings concentrated in vacuo to a small volume (20 cc.). The oily residue is triturated with ethyl acetate (150 cc.), stood in a refrigerator for 2 hours and filtered. The yellow product obtained is recrystallised from methyl ethyl ketone (160 cc.), filtered, washed with ethyl acetate (40 cc.) and then dried, giving bright yellow 2-ethyl-isothionicotinamide-S-oxide (14.5 g.), M.P. 142° C.

Example III

A mixture of 12 N hydrochloric acid (11.7 cc.) and ethanol (40 cc.) is added, over 30 minutes and at a temperature kept between 30 and 35° C., to a suspension comprising 2-n-butyl-isothionicotinamide (19.4 g.), sodium perborate (23 g.), pyridine (50 cc.), and ethanol (100 cc.), which has been heated to 30° C. When addition is complete, the reaction mixture is stirred and the temperature allowed to fall over a period of 1 hour to that of the laboratory, after which 10 N sodium hydroxide solution (14 cc.) is added over 5 minutes. After this addition, stirring is continued for 15 minutes after which the reaction mixture is filtered and the residue washed with ethanol (150 cc.). The combined filtrate and washings are concentrated in vacuo (to about 15 cc.). The orange-yellow oily residue is taken up in methylenechloride (250 cc.) and the solution obtained washed by decanting with water (100 cc.). After evaporation to dryness on a water bath, the residue is taken up in ethyl acetate (40 cc.) and allowed to stand for 4 hours in a refrigerator. The bright yellow crystalline precipitate is filtered off, washed with diethyl ether (40 cc.) and then dried, giving 2-n-butyl-isothionicotinamide-S-oxide (9 g.) in the form of bright yellow crystals. This product presents a first softening at 82–84° C. followed by resolidification and a second, complete, melting at 92–93° C.

Example IV 2-ethyl-isothionicotinamide (33.2 g.), sodium percarbonate (30 g.), pyridine (100 cc.) and ethanol (50 cc.) are mixed together and then hydrochloric acid ($d=1.19$; 44 g.) is added over 1 hour with mechanical stirring, the temperature not being allowed to exceed 26–27° C. When addition is complete, the stirring is continued for 30 minutes at laboratory temperature and the inorganic salts, which are insoluble in the medium, are filtered off and washed with ethanol (2 x 10 cc.). The combined filtrate and washings are evaporated to dryness in vacuo (0.2 mm. Hg) by heating on a water bath at 25–28° C. The crystalline residue is extracted with chloroform (100 cc.), and the chloroform solution obtained is then stirred twice with distilled water (30 cc. each time) and dried with anhydrous sodium sulphate (15 g.). After filtration, ethyl acetate (300 cc.) is added, the crystallisation seeded and allowed to stand for 1 hour in a refrigerator. A yellow crystalline precipitate forms which is separated, washed with ethyl acetate (2 x 25 cc.) and dried at 20° C. in vacuo (0.2 mm. Hg). 2-ethyl-isothionicotinamide-S-oxide (18 g.), M.P. 141° C., is thus obtained.

We claim:

1. Process for the preparation of S-oxides of isothionicotinamide compounds which comprises oxidising an isothionicotinamide of the formula:

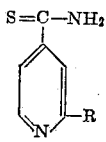

wherein R represent a member of the class consisting of hydrogen and alkyl of up to five carbon atoms with an inorganic per-salt selected from the class consisting of the alkali metal perborates and percarbonates at a temperature between 10° and 40° C. in an inert liquid medium.

2. Process according to claim 1 in which the oxidation is carried out in an inert organic liquid medium.

3. Process according to claim 1 in which the oxidation is carried out in an inert aqueous organic medium.

References Cited in the file of this patent

FOREIGN PATENTS 800,250     Great Britain _____ Aug. 20, 1958
843,756     Great Britain _____ Aug. 10, 1960

OTHER REFERENCES

Reid: "Organic Chemistry of Bivalent Sulfur," vol. 4, pp. 52–3 (Chemical Publishing Co. (1962).

Kitamura et al.: "J. Pharm. Soc. Japan," vol. 55, pp. 330–49 (1935), German abstract, Ibid. pp. 78–82.

Walter et al.: "Chem. Ber.," vol. 93, pages 1511–17 (1960).

Walter: "Ann.," vol. 633, pages 35–55 (1960).